United States Patent [19]
Bleier et al.

[11] Patent Number: 5,949,543
[45] Date of Patent: Sep. 7, 1999

[54] MONOLITHIC OPTICAL ASSEMBLY AND ASSOCIATED RETROREFLECTOR WITH BEAMSPLITTER ASSEMBLY

[75] Inventors: Zvi Bleier, Commack; Itai Vishnia, Wantagh, both of N.Y.

[73] Assignee: PLX, Inc., Deer Park, N.Y.

[21] Appl. No.: 08/967,624

[22] Filed: Nov. 12, 1997

[51] Int. Cl.$^6$ ..................................................... G01B 9/02
[52] U.S. Cl. ............................................. 356/346; 356/345
[58] Field of Search ..................................... 356/345, 346, 356/358, 363, 244; 250/339.07, 339.08

[56] References Cited

U.S. PATENT DOCUMENTS

| | | | |
|---|---|---|---|
| 4,684,255 | 8/1987 | Ford | 356/346 |
| 4,693,603 | 9/1987 | Auth . | |
| 4,726,657 | 2/1988 | Perkins et al. | 356/244 |
| 4,773,757 | 9/1988 | Doyle . | |
| 4,784,488 | 11/1988 | Doyle et al. . | |
| 4,810,092 | 3/1989 | Auth . | |
| 4,991,961 | 2/1991 | Strait . | |
| 5,066,990 | 11/1991 | Rippel . | |
| 5,153,675 | 10/1992 | Beauchaine . | |
| 5,313,269 | 5/1994 | Ponce et al. . | |
| 5,486,917 | 1/1996 | Carangelo et al. . | |
| 5,537,208 | 7/1996 | Bertram et al. | 356/346 |
| 5,541,728 | 7/1996 | Dierking . | |

FOREIGN PATENT DOCUMENTS

| | | |
|---|---|---|
| 63-241435 | 10/1988 | Japan . |
| 4-142430 | 5/1992 | Japan . |
| WO 87/05100 | 8/1987 | WIPO . |

*Primary Examiner*—Samuel A. Turner
*Attorney, Agent, or Firm*—Michael R. Gilman; Kaplan & Gilman LLP

[57] ABSTRACT

In accordance with the invention, an improved optical assembly having a monolithic structure, and an improved optical assembly having a monolithic structure and a retroreflector/beamsplitter combination is provided. The monolithic optical assembly comprises top and bottom plates which are joined into a monolithic structure by first and second mounting members and a beamsplitter. The assembly also comprising a first reflecting assembly in reflecting relation with the beamsplitter. An alternate embodiment of the invention substitutes the monolithic structure having the above six components, with a monolithically constructed hollow corner-cube retroreflector, wherein one of the retroreflector panels is a reflecting surface, another panel (situated at a 45 degree angle to the reflecting surface of the first panel) is a beamsplitter, and the third panel is a support panel used to complete the construction of the hollow corner-cube retroreflector.

60 Claims, 8 Drawing Sheets

MONOLITHIC OPTICAL ASSEMBLY AND ASSOCIATED RETROREFLECTOR WITH BEAMSPLITTER ASSEMBLY

BACKGROUND OF THE INVENTION

This invention relates to the field of optical assemblies, and more particularly to a monolithic optical assembly for use in an interferometer.

Interferometers are old in the art, with Michelson interferometers having been first designed over 100 years ago. An interferometer is an optical assembly used to measure radiation spectra, with the interferometer producing an interference pattern between two beams of light that traverse different paths. An interferometer divides a beam of radiation emanating from a radiation source through use of a beamsplitter inclined at a 45° angle to two reflecting assemblies whose optical paths are at 90 degrees to each other. One of the reflecting assemblies is fixed, while the other is movable along the radiation's path, so as to introduce the path difference, thereby creating the interference pattern which is read by a detector after the divided beam of radiation is recombined through reflection off of the two reflecting assemblies. The variation in the intensity of the beams passing to the detector is a function of the path difference, and ultimately yields the spectral information in a Fourier transform spectrometer.

In practice, interferometers are used for the above discussed spectrometry, and for accurate distance measuring and equipment calibrations.

The prior art optical assemblies used in the construction of standard Michelson interferometers, and other type interferometers, have consisted primarily of structures having parts which are in need of high accuracy alignment. For example, the arrangement of the two reflecting assemblies and the beamsplitter must be highly accurate in the perpendicular and 45 degree arrangements in order to avoid errors introduced due to any such misalignment. The trouble with these prior art interferometers and optical assemblies results from the cost involved in meticulously aligning the optical pieces, and the subsequent cost of maintaining the alignment of those pieces after shocks and vibrations cause them to be misaligned.

A further disadvantage in the prior art optical assemblies and interferometers results from the physical need of replacing beamsplitters with different beamsplitters depending upon the radiation source used in a particular measurement or experiment. Specifically, a typical beamsplitter is useful for only one particular wavelength spectrum section of a source of radiation, or alternatively, a very small range of radiation wavelength spectrum sections, and it is therefore necessary to have multiple interferometers, each having different beamsplitters, or to constantly need to replace a beamsplitter in a single interferometer, so that the interferometer can be used for other applications.

Accordingly, it would be desirable to provide an optical assembly, with and without a retroreflector/beamsplitter combination, that provides high accuracy measurements in a unit which is monolithic in construction, so that field calibrations and maintenance of the optical components of the assembly are not required after shocks, vibrations, or due to temperature changes. It would also be desirable to provide an optical assembly which is monolithically constructed and which forms the major alignment components of an interferometer, so as to facilitate easy and cost effective maintenance and replacement of the optical assembly within a single interferometer for use with different intensity radiations, which optical assembly is not subject to misalignment from shocks, vibrations, or temperature changes due to the monolithic structure of the assembly.

SUMMARY OF THE INVENTION

In accordance with the invention, an improved optical assembly having a monolithic structure, and an improved optical assembly having a monolithic structure and a retroreflector/beamsplitter combination is provided. The monolithic optical assembly comprises top and bottom plates which are joined into a monolithic structure by first and second mounting members and a beamsplitter. The assembly also comprising a first reflecting assembly in reflecting relation with the beamsplitter. An alternate embodiment of the invention substitutes the monolithic structure having the above six components, with a monolithically constructed hollow corner-cube retroreflector, wherein one of the retroreflector panels is a reflecting surface, another panel (situated at a 45 degree angle to the reflecting surface of the first panel) is a beamsplitter, and the third panel is a support panel used to complete the construction of the hollow corner-cube retroreflector.

Accordingly, it is an object of the invention to provide an improved optical assembly for use in a interferometer which is monolithically constructed.

Still another object of the invention is to provide an improved optical assembly which achieves high accuracy measurements and resists misalignment due to shock, vibrations, or temperature changes.

Yet another object of the invention is to provide an improved optical assembly which because of its monolithic construction is easily interchangeable with other such constructed optical assemblies for variation of beamsplitters in interferometers for use with different radiation sources.

Other objects of the invention will in part the obvious and will in part the apparent from the following description.

The invention accordingly comprises assemblies possessing the features, properties, and the relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
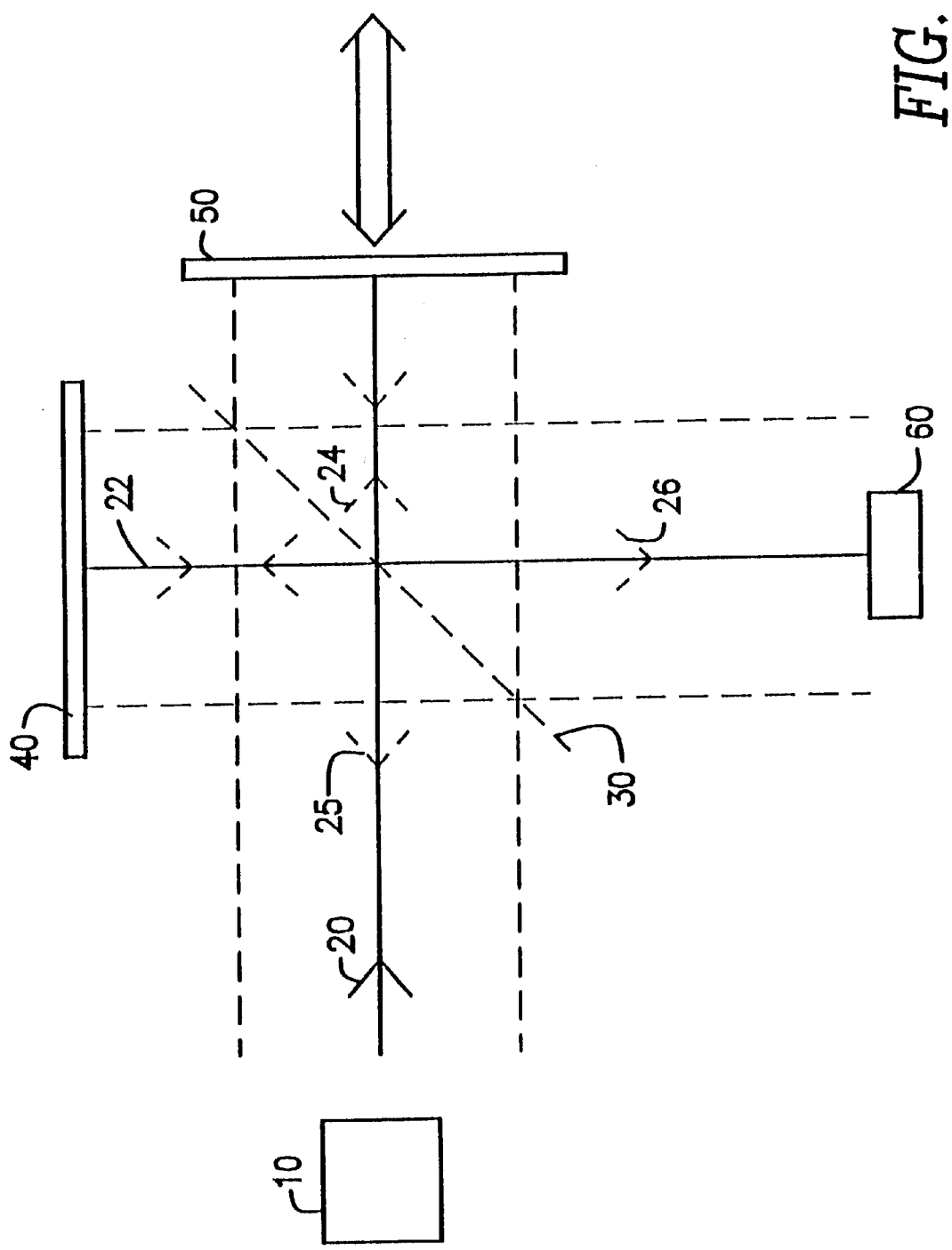
FIG. 1 is a diagram showing how radiation is reflected in a prior art Michelson interferometer.

Referring first to FIG. 1, a standard Michelson interferometer is shown. The Michelson interferometer has a radiation source 10 which sends a single radiation beam 20 towards beamsplitter 30 which is situated at a 45 degree angle to two mirrors, a fixed mirror 40 and a movable mirror 50. Radiation 20 is partially reflected toward fixed mirror 40 in the form of radiation beam 22, and is partially translated through beamsplitter 30 towards movable mirror 50 as radiation beam 24.

Beam 22 is then reflected off of fixed mirror 40, back towards beamsplitter 30, where it is once again partially split, sending some radiation 25 back towards source 10, and some radiation 26 toward detector 60. Similarly, beam 24 reflects off of movable mirror 50 and is reflected back toward beamsplitter 30. Here also, beam 24 is against split, sending some radiation 25 back to source 10 and other radiation 26 toward detector 60.

Detector 60 measures the interference between the two radiation beams emanating from the single radiation source. These beams have, through translation and reflection, traveled different optical path lengths, which creates the fringe effect which is visible and measurable to detector 60.

Figure 2:
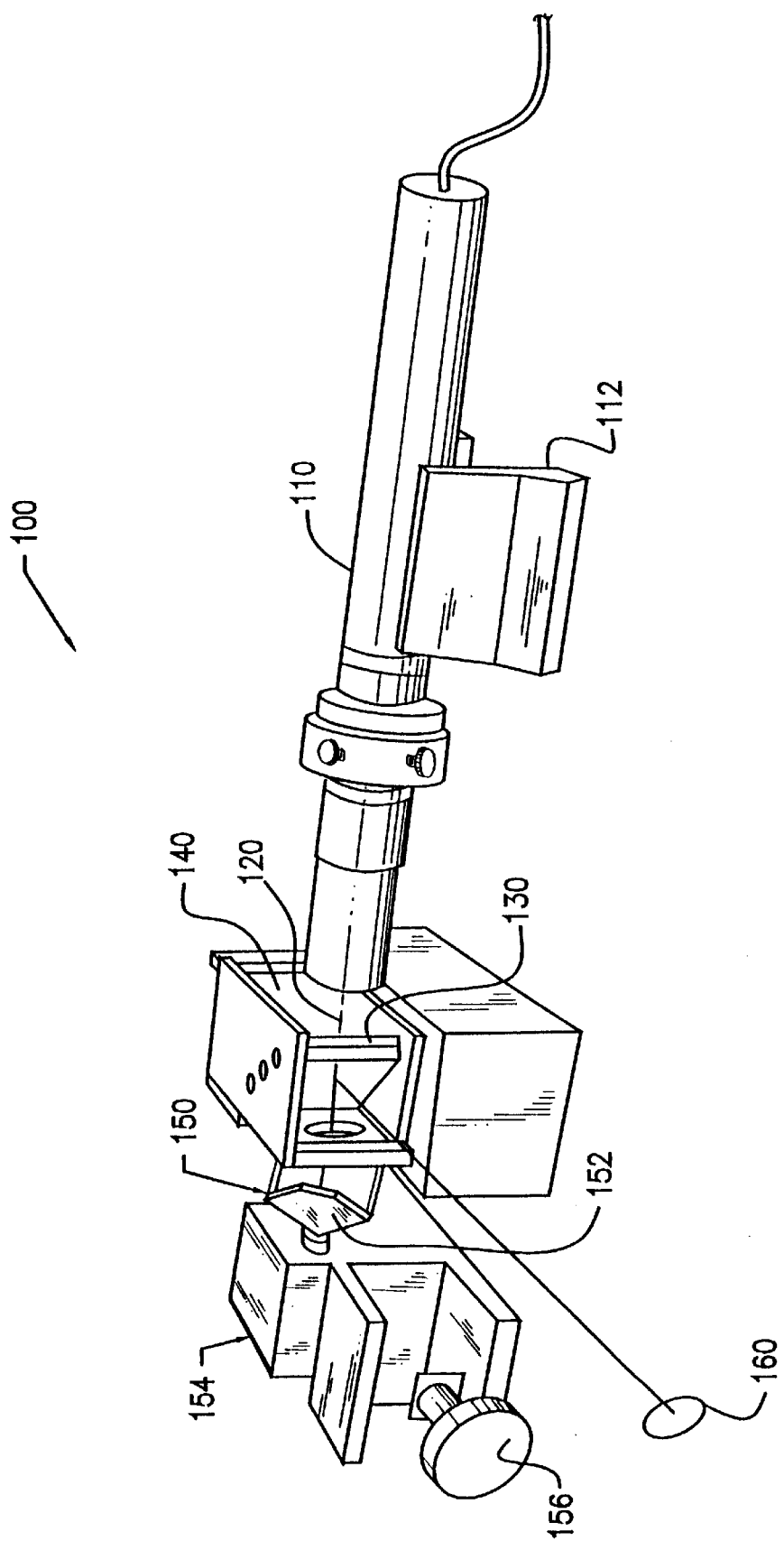
FIG. 2 is a perspective view of an interferometer having the monolithic optical assembly of the invention.

Directing attention now to FIG. 2, the standard lay out and component structure of a Michelson interferometer is shown at interferometer 100, and includes a radiation source 110, a beamsplitter 130, a movable reflecting assembly 150, a fixed reflecting assembly 140 and a detector 160.

Radiation source 110 is mounted in a secure position by mounting assembly 112. With radiation source 110 in mounting assembly 112, radiation beam 120 is alignable along a path which will fix the direction of the beam at a 45 degree angle to beamsplitter 130.

Radiation source 110 can be collimated white light or even a signal collimated radiation intensity laser light source, and all of the items are anticipated by the invention.

Discussing now movable reflecting assembly 150, the preferred embodiment shows that instead of a single panel mirror, a hollow corner-cube retroreflector 152 is used. It is anticipated that the hollow corner-cube retroreflector would be made in its preferred embodiment as is dictated by the disclosure of U.S. Pat. No. 3,663,084 to Lipkins.

Retroreflector 152 is mounted to a movable base assembly 154, which assembly allows for adjustment of the location of retroreflector 152 in a line along the path of beam 120. The displacement of assembly 154 is adjustable through use of adjusting knob 156, but other means of moving assembly 154 are also anticipated by the invention, including such means that might allow for continuous, uniform movement of assembly 154. It is also possible that the manor of mounting retroreflector 152 to assembly 154 might be made in accordance with the structure described in U.S. Pat. No. 5,335,111, to Bleier.

The use of retroreflector 152 as movable reflecting assembly 150 allows for any orientation of retroreflector 152, as long as the reflecting surfaces of the retroreflector are at a 45 degree angle to the direction of incoming beam 120 after it passes through beamsplitter 130.

Figure 3:
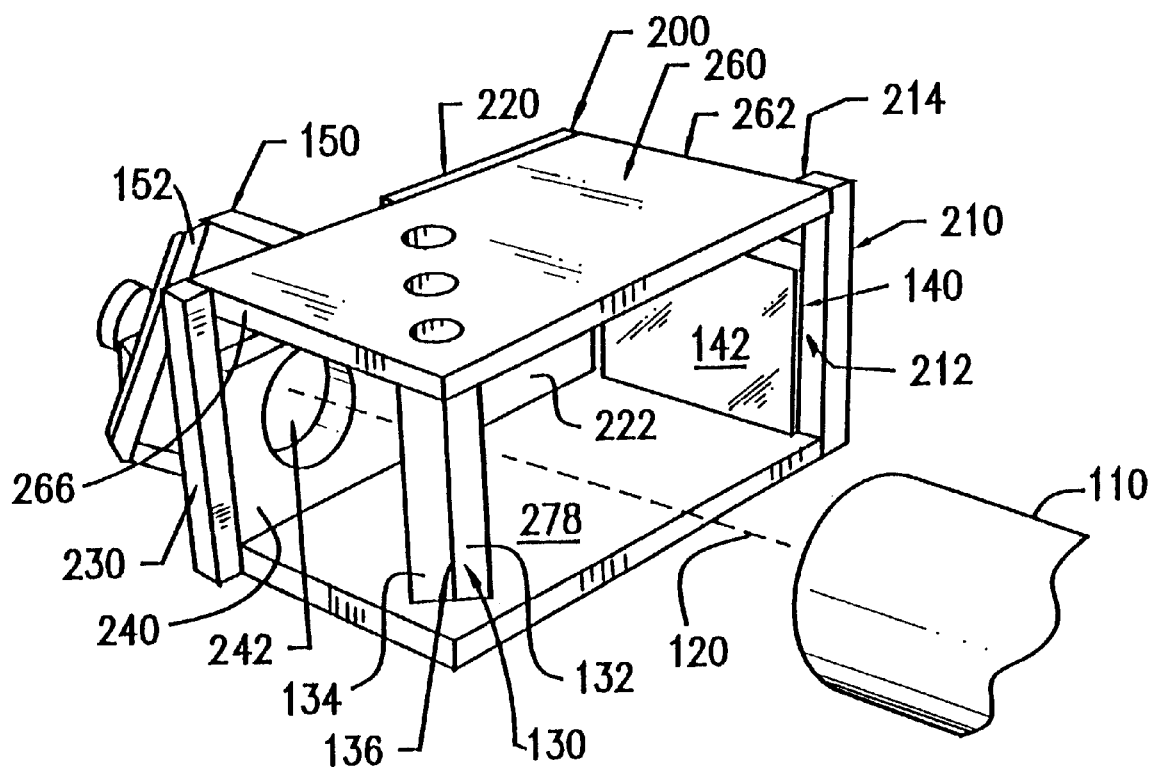
FIG. 3 is a perspective view of the monolithic optical assembly of the invention.
Figure 4:
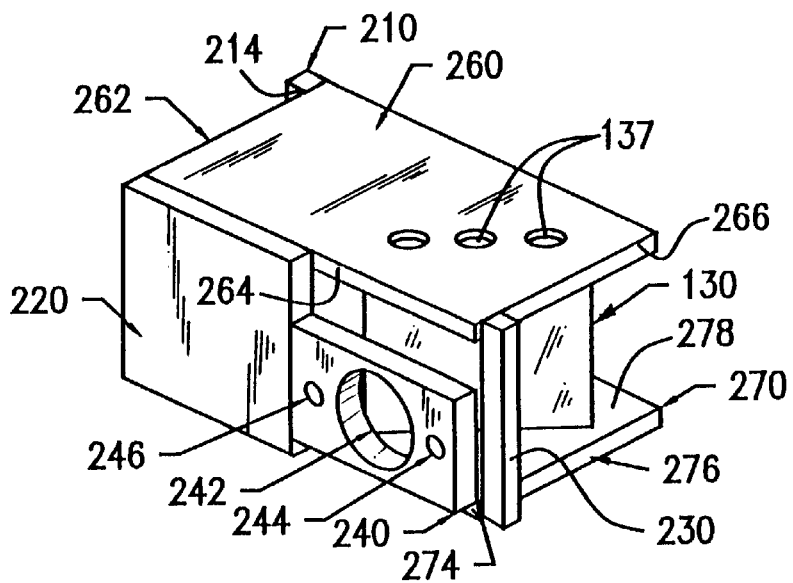
FIG. 4 is an alternate perspective view of a another side of the monolithic optical assembly of the invention.

Turning now to a more detail discussion of monolithic optical assembly 200, as seen in FIGS. 2–4, it is seen that beamsplitter 130 and reflecting assembly 140 are mounted within monolithic optical assembly 200. As will be further discussed herein, and for further structural analysis of assembly 200, attention is also directed to FIGS. 5–7. The difference between the embodiments of FIGS. 2–4 and FIGS. 5–7, regards openings 244 and 246 (see FIGS. 5–7). These additional openings in mounting member 240, are associated with the use of a radiation source 110 which is a HeNe (helium neon) laser source for use in distance measurements. While the purpose of the second embodiment shown in FIGS. 5–7 will be discussed below, the overall structure of assembly 200 is otherwise identical with that of assembly 200 of FIGS. 2–4, and for purposes of describing that structure, FIGS. 2–7 will now be discussed.

As seen in FIG. 3, monolithic optical assembly 200 is comprised of a top plate 260, a bottom plate 270 and at least first and second mounting members 210 and 220, respectively, and beamsplitter 130. As an add on for some additional structural stability, which stability is not essential, third mounting member 230 can also be used.

As seen in the figures, mounting member 210 has a first edge surface 212 and a second edge surface 214. A portion of first edge 212 is adhered to a portion of a first edge 262 of top plate 260 (see FIG. 4), while another portion of first edge 212 of mounting member 210 is adhered to a portion of a first edge surface of bottom plate 270 (also see FIG. 4).

Continuing with FIG. 4, around the corner from mounting member 210, is second mounting member 220. Second mounting member 220 is adhered to top and bottom plates 260 and 270 along different portions of a first surface 222 thereof. The portions of first surface 222 of mounting member 220 are adhered to portions of a second edge surface 264 of top plate 260 and second edge surface 274 of bottom plate 270.

Figure 7:
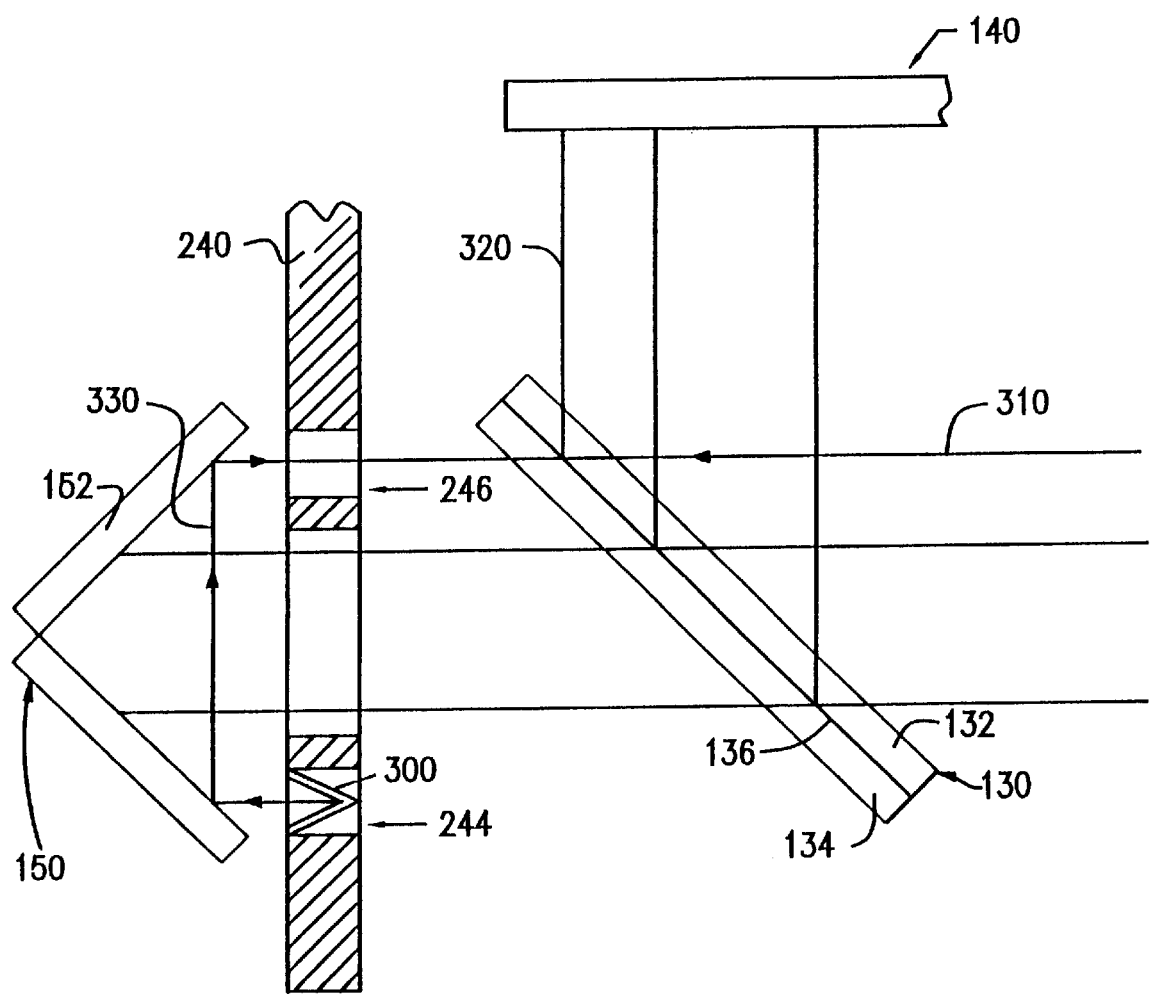
FIG. 7 is a partial top plan view of an alternate embodiment of the invention.

Beamsplitter 130, as seen in the figures and in particular in FIG. 7, is comprised of two panels 132 and 134, which panels are adhered to each other along a common surface 136. Surface 136 is an optically flat reflecting surface having a beamsplitter coating thereon. Beamsplitter 130 is adhered along portions of top edges 137 to portions of bottom surface 267 of top plate 260, and along portions of bottom edges 138 to portions of top surface 278 of bottom plate 270. However, as is customary when beamsplitters are used, a compensating plate is also used. In this case, beamsplitter 130 has the compensating plate built in; i.e., panel 132. The purpose of the compensating panel is to equate the optical path velocities of the two beams created by the beamsplitter coating. Without the compensating plate, the beam translated through the beamsplitter would travel through panel 134 three times, while the reflected beam would travel only once through beamsplitter 130. By adding panel 132, both beams translate through equally sized panels four times each, thereby equating any differences they may have experienced in optical length.

Figure 9:
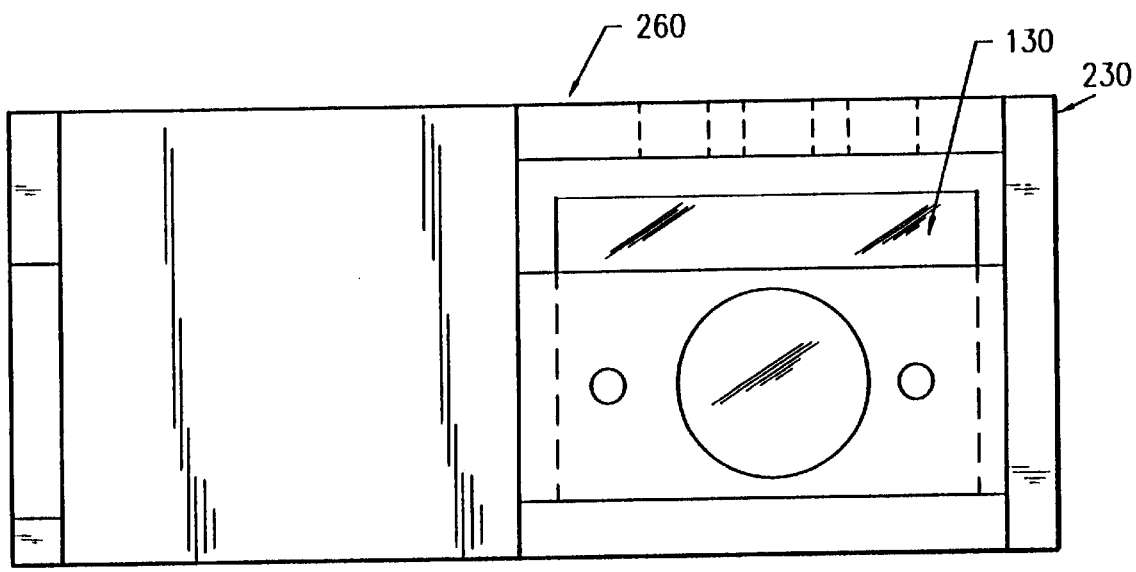
FIG. 9 is a side elevational view of another embodiment of the elevation of FIG. 6.
Figure 10:
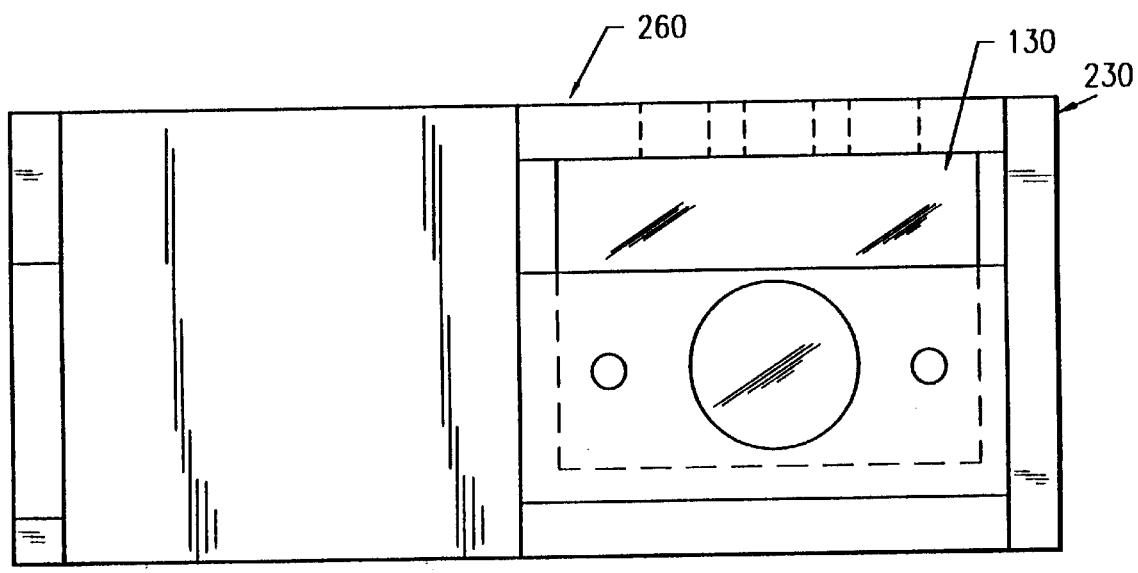
FIG. 10 is yet another side elevational view of another embodiment of the elevation of FIG. 6.

The support combination of first mounting member 210, second mounting member 220 and beamsplitter 130 between top plate 260 and bottom plate 270 is what creates the monolithic structure of the invention. As early discussed, it is also possible to have third mounting member 230 situated between portions of third edge surfaces 266 and 276 of top and bottom plates 260 and 270, respectively, as seen in the figures. In fact, as seen in FIGS. 9 and 10, the monolithic structure is achievable without beamsplitter 130 touching both the top and bottom plates. The stable monolithic structure is then achieved by having third mounting member 230 adhered as shown in the figures, and similarly to how member 210 is adhered. Accordingly, it is seen in FIGS. 9 and 10 that beamsplitter 130 can be adhered only along its bottom edges 138 to bottom plate 270 (FIG. 9), or only along its top edges 137 to top plate 260 (FIG. 10).

To complete the required reflecting elements of a Michelson interferometer, it is seen in the figures that a mirror panel 140 is adhered to a portion of top surface 278 of bottom plate 270, and to a second edge surface 214 of mounting member 210. Mirror panel 140 is slightly over hanging top surface 278 of bottom plate 270 by a portion of a bottom edge surface of mirror panel 140, and adhesive is applied between these touching surfaces. Adhesive is also applied between the side edge surface of mirror panel 140 that touches edge surface 214 of mounting member 210. Quantities of adhesive are applied in a manner to avoid distorting the optically flat nature of the reflecting surface 142 of mirror panel 140.

Since minor panel 140 is fixedly adhered to assembly 200, as has just been discussed, there is no necessity for panel 140 to be other than a single, flat paneled mirror; for example, panel 140 does not need to be a retroreflector. One of the benefits of using a retroreflector (as has been discussed earlier regarding movable reflecting assembly 150) in a structure is that the orientation of the retroreflector is unimportant, as long as the incident radiation is at a 45 degree angle to the surfaces of the retroreflector. In the subject invention, the secured mounting of panel 140 to the monolithic structure assures that the orientation of panel 140 will not fluctuate due to vibration and shock, and therefore, a retroreflector is unnecessary (although a retroreflector could of course be utilized).

Figure 5:
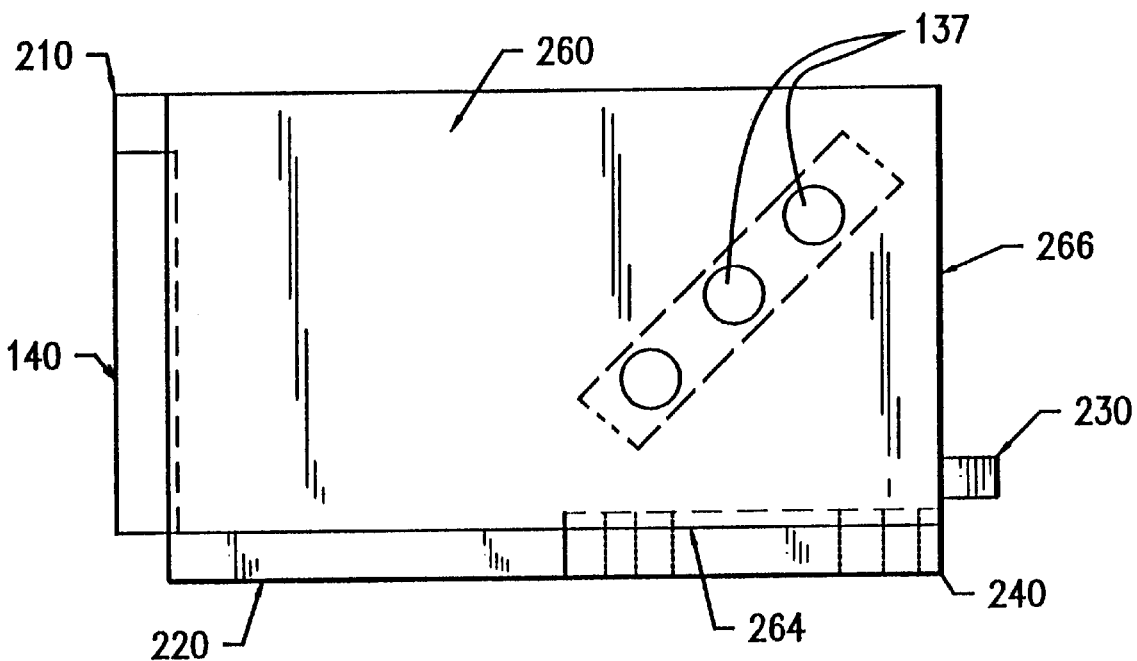
FIG. 5 is a top plan view of the monolithic optical assembly of the invention.
Figure 6:
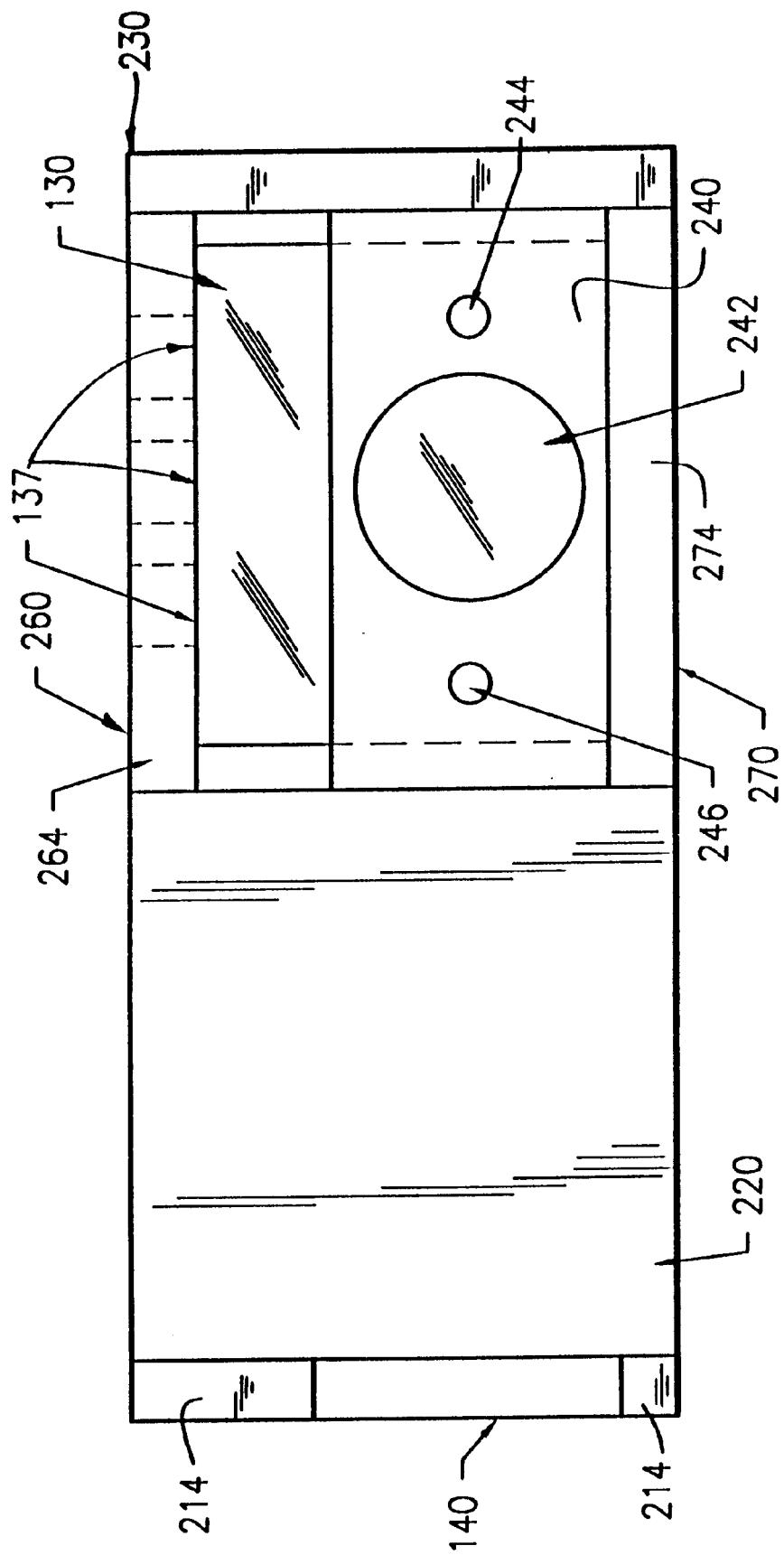
FIG. 6 is a side elevational view of one side of the monolithic optical assembly of the invention.

Assembly 200 can also have a fourth mounting member 240. While the main purpose of fourth mounting member 240 is not to help stabilize the monolithic structure of assembly 200, it is nevertheless called a mounting member herein. Instead, fourth mounting member 240 is positioned in relation to the path traveled by beam 120 so as to allow beam 120 to pass through opening 242 in member 240, to travel between beamsplitter 130 and movable reflecting assembly 150. Member 240 is mounted similarly to how mirror panel 140 is mounted, along a thin portion of an edge thereof onto a portion of top surface 278 of bottom plate 270 (as best seen in FIG. 5), and along a side edge thereof which abuts and is adhered to an edge of mounting member 220 (also as best seen in FIG. 5).

All of the members, 210, 220, 230, 240, 260, 270, 130, and 140, of assembly 200, are made of the same material. The material preferably being either fused quartz or annealed Pyrex. The use of such materials allows the coefficients of expansion of the materials to be identical, so that any temperature changes experienced by assembly 200 is experienced equally throughout each member to allow assembly 200 to expand and contract uniformly, thereby removing the possibility of distortions in the reflecting surfaces of beamsplitter 130 and mirror panel 140.

Turning now to a discussion of FIG. 7, as has been earlier discussed, openings 244 and 246 in fourth mounting member 240 are used with a HeNe single source laser light. The light, or radiation, is seen at 310, emanating from a light source (not shown). Light 310 passes through beamsplitter 130 with part of the light being 320 being reflected to mirror panel 140, and another part of the light 330 being translated through beamsplitter 130, through opening 246, so as to reflect off of retroreflector 152 of movable reflecting assembly 150.

Within number 240, and more particularly within opening 244, there is a small retroreflector 300.

Retroreflector 300 is made in accordance with standard retroreflectors as earlier recited from U.S. Pat. No. 3,663,084, and may be mounted within opening tube 44 as described in U.S. Pat. No. 3,977,765, to Lipkins. Beam 330 is then 10 reflected back to reflecting assembly 150 and out through opening 246 back through beamsplitter 130 and to a detector.

Figure 8:
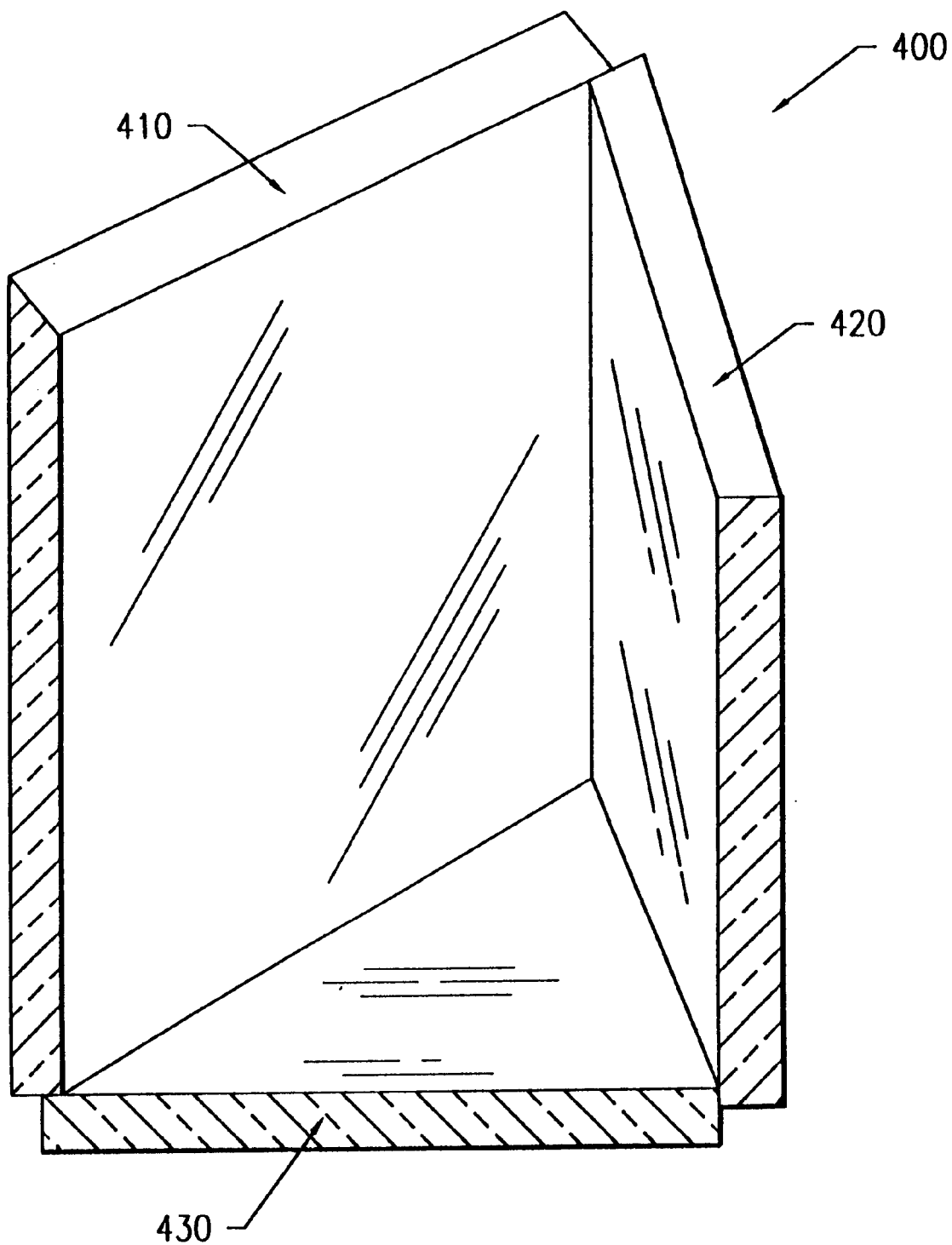
FIG. 8 is a perspective view of a third embodiment of the invention showing the monolithic optical assembly as a retroreflector/beamsplitter combination.

Turning now to a discussion of the final figure, FIG. 8, a third embodiment of the monolithic structure for the optical assembly of the invention is disclosed at 400. Assembly 400 is in its most fundamental form, a hollow, corner-cube retroreflector as been discussed earlier in this disclosure, and as has been mentioned from U.S. Pat. No. 3,663,084 to Lipkins.

The difference between the disclosure of FIG. 8 and these prior art retroreflectors is that one of the mirror panels of the retroreflector is, in fact, a beam splitter panel 410, which by definition is at a 45 degree angle to the other mirror panel 420 of assembly 400.

Third panel 430 is not a reflecting panel, but is merely a support panel for completion of the retroreflector structure. Such a structure, as has been described in the prior art, utilizes the overlapping alternating adhesions between an edge of one panel to the reflective surface of an adjacent panel, etc..

In effect, one could substitute the monolithic retroreflector structure of FIG. 8 for the entire structure of assembly 200 (previously discussed), to achieve substantially the same results, and accordingly, the disclosure of FIG. 8 is properly described as an alternate embodiment of the structures of FIGS. 2–7 in the application.

It will thus be seen that the objects set forth above, among those made apparent from the proceeding description, are efficiently obtained, and, since certain changes may be made in the above constructions without the party from the sphere and scope of the invention, it is intended that all matter contained in the above description as shown in the accompanying drawing shall be interpreted as illustrative and not in a limiting sense.

It is also to be understood that the following claims are intended to cover all of the generic and specific features of the invention herein described and all statements of the scope of the invention, which, as a matter of language, might be said to fall there between.

What is claimed is:

1. A monolithic optical assembly for use with an interferometer, comprising:

a top plate having top, bottom and edge surfaces;

a bottom plate having top, bottom and edge surfaces;

a first mounting member having first and second edges, wherein a portion of said first edge is adhered to a portion of a first edge of said top plate and another portion of said first edge is adhered to a portion of a first edge of said bottom plate;

a second mounting member having a first surface and a first edge, wherein a portion of said first surface is adhered to a portion of a second edge of said top plate and another portion of said first surface is adhered to a portion of a second edge of said bottom plate;

a first mirror assembly having at least one reflecting surface, wherein said first mirror assembly is adhered between at least two of either said first mounting member and said top plate or said bottom plate, or between said second mounting member and said top plate or said bottom plate; and a beamsplitter assembly having a surface having a beamsplitter coating, said surface being in reflecting relation with said first mirror assembly, and having top and bottom edges, said top edge of said beamsplitter assembly adhered along a portion of said bottom surface of said top plate and said bottom edge of said beamsplitter assembly adhered along another portion of said top surface of said bottom plate;

wherein said adhesion of said first and second mounting members and said beamsplitter assembly to said top and bottom plates creates a substantially stable, substantially vibration and shock resistant structure regarding said reflective relationship between said first mirror assembly and said beamsplitter assembly.

2. A monolithic optical assembly as recited in claim 1, wherein said at least one reflecting surface of said first mirror assembly is optically flat.

3. A monolithic optical assembly as recited in claim 2, wherein said surface of said beamsplitter assembly is optically flat.

4. A monolithic optical assembly as recited in claim 1, further comprising a third mounting member having an edge, wherein a portion of said edge is adhered to a portion of a third edge of said top plate and another portion of said edge is adhered to a portion of a third edge of said bottom plate.

5. A monolithic optical assembly as recited in claim 4, wherein said top and bottom plates, said first, second and third mounting members, said first mirror assembly and said beamsplitter assembly are made of material having substantially the same coefficient of thermal expansion.

6. A monolithic optical assembly as recited in claim 4, wherein said surfaces and said edges of said top and bottom plates, said first, second and third mounting members, said first mirror assembly and said beamsplitter assembly are lapped.

7. A monolithic optical assembly as recited in claim 4, wherein said top and bottom surfaces of said top plate lie in planes which are substantially parallel to each other, said top and bottom surfaces of said bottom plate lie in planes which are substantially parallel to each other, and said edges of said plates lie in planes which are substantially perpendicular to said planes of said surfaces of said plates.

8. A monolithic optical assembly as recited in claim 7, wherein said edges of said first mounting member lie in planes which are substantially perpendicular to each other.

9. A monolithic optical assembly as recited in claim 8, wherein said first surface of said second mounting member and said first edge of said second mounting member lie in planes which are substantially perpendicular to each other.

10. A monolithic optical assembly as recited in claim 1, wherein said surface of said beamsplitter assembly lies in a plane which is aligned at a substantially 450 angle to a second plane in which said at least one reflecting surface of said first mirror assembly lies.

11. A monolithic optical assembly as recited in claim 10, wherein said beamsplitter assembly comprises first and second panels, said first panel having a first surface and said second panel having a second surface, with said panels being joined together along said first and second surfaces.

12. A monolithic optical assembly as recited in claim 11, wherein said beamsplitter coating is located between said adhered together first and second panels of said beamsplitter assembly.

13. A monolithic optical assembly as recited in claim 12, wherein said top plate has a plurality of openings extending therethrough in positions proximate to said placement of said beamsplitter assembly and said top plate, so that portions of said beamsplitter assembly are accessible through said openings.

14. A monolithic optical assembly as recited in claim 1, further comprising a fourth mounting member adhered to said second mounting member and to still another portion of said top surface of said bottom plate, to be in reflecting relation with said beamsplitter assembly.

15. A monolithic optical assembly as recited in claim 14, said fourth mounting member having at least one opening extending therethrough for translation of radiation therethrough.

16. A monolithic optical assembly as recited in claim 14, said fourth mounting member having at least two openings extending therethrough, one for translation of radiation therethrough and another having mounted therein a reflecting assembly.

17. A monolithic optical assembly as recited in claim 16, wherein said reflecting assembly of said fourth mounting member is a hollow corner cube retroreflector.

18. A monolithic optical assembly as recited in claim 17, wherein the reflecting surfaces of said retroreflector of said fourth mounting member face away from said beamsplitter assembly.

19. A monolithic optical assembly for use with an interferometer, comprising:

a top plate having top, bottom and edge surfaces;

a bottom plate having top, bottom and edge surfaces;

a first mounting member having first and second edges, wherein a portion of said first edge is adhered to a portion of a first edge of said top plate and another portion of said first edge is adhered to a portion of a first edge of said bottom plate;

a second mounting member having a first surface and a first edge, wherein a portion of said first surface is adhered to a portion of a second edge of said top plate and another portion of said first surface is adhered to a portion of a first edge of said bottom plate;

a first mirror assembly having at least one reflecting surface, wherein said first mirror assembly is adhered between at least two of either said first mounting member and said top plate or said bottom plate, or between said second mounting member and said top plate or said bottom plate;

a beamsplitter assembly having a surface having a beamsplitter coating, said beamsplitter assembly adhered to either said top or bottom plate of said monolithic optical assembly, so that said surface is in reflecting relation with said first mirror assembly; and a third mounting member having an edge, wherein a portion of said edge is adhered to a portion of a third edge of said top plate and another portion of said edge is adhered to a portion of a third edge of said bottom plate;

wherein said adhesion of said first, second and third mounting members to said top and bottom plates creates a substantially stable, substantially vibration and shock resistant structure regarding said reflective relationship between said first mirror assembly and said beamsplitter assembly.

20. An interferometer assembly, comprising:

a radiation source;

a first mirror assembly having at least one reflecting surface;

a monolithic reflecting structure having at least two reflecting surfaces in reflecting relation with said first mirror assembly, said monolithic reflecting structure, comprising:

a top plate having top, bottom and edge surfaces;

a bottom plate having top, bottom and edge surfaces;

a first mounting member having first and second edges, wherein a portion of said first edge of said first mounting member is adhered to a portion of a first edge of said top plate and another portion of said first edge of said first mounting member is adhered to a portion of a first edge of said bottom plate;

a second mounting member having a first surface and a first edge, wherein a portion of said first surface of said second mounting member is adhered to a portion of a second edge of said top plate and another portion of said first surface of said second mounting member is adhered to a portion of a second edge of said bottom plate;

a second mirror assembly having at least one reflecting surface, wherein said second mirror assembly is adhered between at least two of either said first mounting member and said top plate or said bottom plate, or between said second mounting member and said top plate or said bottom plate; and a beamsplitter assembly having a surface having a beamsplitter coating, said surface being in reflecting relation with said first and second mirror assemblies, and having top and bottom edges, said top edge of said beamsplitter assembly adhered to a portion of said bottom surface of said top plate and said bottom edge of said beamsplitter assembly adhered to another portion of said top surface of said bottom plate;

wherein said adhesion of said first and second mounting members and said beamsplitter assembly to said top and bottom plates creates a substantially stable, substantially vibration and shock resistant structure regarding said reflective relationship between said second mirror assembly and said beamsplitter assembly; and a radiation detector for detecting differences in the intensity variation of said radiation reaching said detector from said radiation source after leaving said beamsplitter assembly and reflecting off of said first and second mirror assemblies.

21. An interferometer assembly as recited in claim 20, wherein said at least one reflecting surface of said first mirror assembly is optically flat.

22. An interferometer assembly as recited in claim 20, wherein said surface of said beamsplitter assembly is optically flat.

23. An interferometer assembly as recited in claim 20, wherein said at least one reflecting surface of said second mirror assembly is optically flat.

24. An interferometer assembly as recited in claim 20, further comprising a third mounting member having an edge, wherein a portion of said edge of said third mounting member is adhered to a portion of a third edge of said top plate and another portion of said edge of said third mounting member is adhered to a portion of a third edge of said bottom plate.

25. An interferometer assembly as recited in claim 24, wherein said top and bottom plates, said first, second and third mounting members, said first mirror assembly and said beamsplitter assembly are made of material having substantially the same coefficient of thermal expansion.

26. An interferometer assembly as recited in claim 24, wherein said surfaces and said edges of said top and bottom plates, said first, second and third mounting members, said first mirror assembly and said beamsplitter assembly are lapped.

27. An interferometer assembly as recited in claim 24, wherein said top and bottom surfaces of said top plate lie in planes which are substantially parallel to each other, said top and bottom surfaces of said bottom plate lie in planes which are substantially parallel to each other, and said edges of said plates lie in planes which are substantially perpendicular to said planes of said surfaces of said plates.

28. An interferometer assembly as recited in claim 27, wherein said edges of said first mounting member lie in planes which are substantially perpendicular to each other.

29. An interferometer assembly as recited in claim 28, wherein said first surface of said second mounting member and said first edge of said second mounting member lie in planes which are substantially perpendicular to each other.

30. An interferometer assembly as recited in claim 20, wherein said surface of said beamsplitter assembly lies in a plane which is aligned at a substantially 45° angle to a second plane in which said at least one reflecting surface of said first mirror assembly lies.

31. An interferometer assembly as recited in claim 30, wherein said beamsplitter assembly comprises first and second panels, said first panel having a first surface and said second panel having a second surface, with said panels being joined together along said first and second surfaces.

32. An interferometer assembly as recited in claim 31, wherein said beamsplitter coating is located between said adhered together first and second panels of said beamsplitter assembly.

33. An interferometer assembly as recited in claim 32, wherein said top plate has a plurality of openings extending therethrough in positions proximate to said placement of said beamsplitter assembly and said top plate, so that portions of said beamsplitter assembly are accessible through said openings.

34. An interferometer assembly as recited in claim 20, further comprising a fourth mounting member adhered to said second mounting member and to still another portion of said top surface of said bottom plate, to be in reflecting relation with said beamsplitter assembly.

35. An interferometer assembly as recited in claim 34, said fourth mounting member having at least one opening extending therethrough for translation of radiation therethrough.

36. An interferometer assembly as recited in claim 34, said fourth mounting member having at least two openings extending therethrough, one for translation of radiation therethrough and another having mounted therein a reflecting assembly, wherein said reflecting assembly is in reflecting relation with said first mirror assembly.

37. An interferometer assembly as recited in claim 36, wherein said reflecting assembly of said fourth mounting member is a hollow corner cube retroreflector.

38. An interferometer assembly as recited in claim 37, wherein the reflecting surfaces of said retroreflector of said fourth mounting member face away from said beamsplitter assembly.

39. An interferometer assembly as recited in claim 20, wherein said first mirror assembly is selectively moveable along a path substantially parallel to a path followed by radiation received and/or reflected by said first mirror assembly.

40. An interferometer assembly as recited in claim 39, wherein said first mirror assembly is a hollow corner cube retroreflector.

41. A monolithic optical assembly for use with an interferometer, comprising:

a top plate having top, bottom and edge surfaces;

a bottom plate having top, bottom and edge surfaces;

a first mounting member having first and second edges, wherein a portion of said first edge is adhered to a portion of a first edge of said top plate and another portion of said first edge is adhered to a portion of a first edge of said bottom plate;

a second mounting member having a first surface and a first edge, wherein a portion of said first surface is adhered to a portion of a second edge of said top plate and another portion of said first surface is adhered to a portion of a second edge of said bottom plate;

a first mirror assembly having at least one reflecting surface, wherein said first mirror assembly is adhered between at least two of either said first mounting member and said top plate or said bottom plate, or between said second mounting member and said top plate or said bottom plate;

a beamsplitter assembly having a surface having a beamsplitter coating, said surface being in reflecting relation with said first mirror assembly, and having top and bottom edges, said top edge of said beamsplitter assembly adhered along a portion of said bottom surface of said top plate and said bottom edge of said beamsplitter assembly adhered along another portion of said top surface of said bottom plate, wherein said adhesion of said first and second mounting members and said beamsplitter assembly to said top and bottom plates creates a substantially stable, substantially vibration and shock resistant structure regarding said reflective relationship between said first mirror assembly and said beamsplitter assembly; and a fourth mounting member adhered to said second mounting member and to still another portion of said top surface of said bottom plate, and extending across an optical path of a radiation beam transmitted through said beamsplitter assembly.

42. A monolithic optical assembly as recited in claim 41, wherein said at least one reflecting surface of said first mirror assembly is optically flat.

43. A monolithic optical assembly as recited in claim 41, wherein said surface of said beamsplitter assembly is optically flat.

44. A monolithic optical assembly as recited in claim 41, said fourth mounting member having at least one opening extending therethrough for translation of radiation therethrough.

45. A monolithic optical assembly as recited in claim 41, said fourth mounting member having at least two openings extending therethrough, one for translation of radiation therethrough and another having mounted therein a reflecting assembly.

46. A monolithic optical assembly as recited in claim 45, wherein said reflecting assembly of said fourth mounting member is a hollow corner cube retroreflector.

47. A monolithic optical assembly as recited in claim 46, wherein the reflecting surfaces of said retroreflector of said fourth mounting member face away from said beamsplitter assembly.

48. A monolithic optical assembly as recited in claim 41, further comprising a third mounting member having an edge, wherein a portion of said edge is adhered to a portion of a third edge of said top plate and another portion of said edge is adhered to a portion of a third edge of said bottom plate.

49. A monolithic optical assembly as recited in claim 48, wherein said top and bottom plates, said first, second and third mounting members, said first mirror assembly and said beamsplitter assembly are made of material having substantially the same coefficient of thermal expansion.

50. A monolithic optical assembly as recited in claim 48, wherein said surfaces and said edges of said top and bottom plates, said first, second and third mounting members, said first mirror assembly and said beamsplitter assembly are lapped.

51. A monolithic optical assembly as recited in claim 48, wherein said top and bottom surfaces of said top plate lie in planes which are substantially parallel to each other, said top and bottom surfaces of said bottom plate lie in planes which are substantially parallel to each other, and said edges of said plates lie in planes which are substantially perpendicular to said planes of said surfaces of said plates.

52. A monolithic optical assembly as recited in claim 51, wherein said edges of said first mounting member lie in planes which are substantially perpendicular to each other.

53. A monolithic optical assembly as recited in claim 52, wherein said first surface of said second mounting member and said first edge of said second mounting member lie in planes which are substantially perpendicular to each other.

54. A monolithic optical assembly as recited in claim 41, wherein said surface of said beamsplitter assembly lies in a plane which is aligned at a substantially 45° angle to a second plane in which said at least one reflecting surface of said first mirror assembly lies.

55. A monolithic optical assembly as recited in claim 54, wherein said beamsplitter assembly comprises first and second panels, said first panel having a first surface and said second panel having a second surface, with said panels being joined together along said first and second surfaces.

56. A monolithic optical assembly as recited in claim 55, wherein said beamsplitter coating is located between said adhered together first and second panels of said beamsplitter assembly.

57. A monolithic optical assembly as recited in claim 56, wherein said top plate has a plurality of openings extending therethrough in positions proximate to said placement of said beamsplitter assembly and said top plate, so that portions of said beamsplitter assembly are accessible through said openings.

58. A retroreflector assembly for use in an interferometer, comprising:

a first panel having a reflecting surface;

a beamsplitter panel having a beamsplitter coating on a surface of said panel, said beamsplitter coating in reflecting relation with said reflecting surface of said first panel; and a support panel having a receiving surface;

wherein each of said panels has a side at substantially a right angle to said surface of said panel, and wherein each of said panels is abutting and joined along said side to said surface of said panel immediately adjacent to said side.

59. A retroreflector assembly as recited in claim 58, wherein said reflecting surface of said first panel is optically flat.

60. A retroreflector assembly as recited in claim 58, wherein said surface of said beamsplitter panel is optically flat.

* * * * *